United States Patent Office 3,546,462
Patented Dec. 8, 1970

3,546,462
SECURITY CUT-OFF DEVICE FOR X-RAY
TOMOGRAPHY APPARATUS
Jean Cesar, Issy-les-Moulineaux, France, assignor to
Compagnie Generale de Radiologie, Paris, France, a
corporation of France
Filed Oct. 18, 1968, Ser. No. 768,673
Claims priority, application France, Oct. 20, 1967,
125,219
Int. Cl. G03b *41/16*
U.S. Cl. 250—95                                                    10 Claims

ABSTRACT OF THE DISCLOSURE

A security device for a tomograph wherein the wiper arms of two potentiometers are coupled to the knobs adjusting the angle of sweep and exposure time of the tomograph. The potentiometers are further coupled to sources of voltage which have values such that the signal taken between the wiper arms will exceed a predetermined value when the ratio of sweep angle to exposure time exceeds a predetermined maximum value which depends upon the physical characteristics of the tomograph. This signal is then fed to apparatus for inhibiting the operation of the tomograph when the predetermined value is exceeded. Further disclosed is a potentiometer circuit coupled to the adjustment knobs for providing a signal proportional to the ratio of sweep angle to exposure time to the drive motors for the tomograph.

---

This invention relates to improvements in radiographic apparatus and more particularly to a security device for remote-controlled radiographic apparatus such as tomographs.

A tomograph permits the taking of radiographs in various planes in such a manner as to eliminate the shadows created by organs or other elements situated in front of or behind the body-part under examination. This is accomplished by synchronizing the movements of the X-ray tube's focal spot and the film. These movements may be linear, circular, sinusoidal, etc., depending upon the application. During exposure, the tube's focal spot describes a spatial trajectory centered on a point situated either in the plane of the body part under examination, or, for example, in the plane of the film. The extremes of the focal spot's trajectory, with respect to the center of the trajectory define an angle $\alpha$, called the angle of sweep. Moreover, the displacement of the X-ray tube occurs during a time interval $t$ during which the image is obtained. The time $t$ is thus called the exposure time. The tube's angular speed during exposure is thus $$\frac{\alpha}{t} = \omega$$

Depending upon the particular conditions under which the apparatus is used, the operator must determine the proper angle of sweep and the proper exposure time. For a number of mechanical reasons, these two variables $\alpha$ and $t$, can be chosen only within certain limits. In particular, the tube's displacement speed, $\alpha/t$, is limited to a value acceptable in terms of possibly damaging the apparatus due to inertial effects on the equipment. It would thus be extremely desirable to have a device which permits the determination, before making the exposure, of whether the $\alpha/t$ relationship of the angle of sweep $\alpha$ to the displacement time $t$ is acceptable, so that damage to the machine is prevented. It would also be desirable to inhibit the exposure if this relationship exceeds a predetermined value.

Therefore, the object of the present invention is to provide an electrical security device for radiographic machines, namely tomographs, which is capable of informing the operator whether the angle of sweep and the exposure time have been correctly chosen within predetermined limits and which would prevent the functioning of the machine if the angle of sweep and the exposure time have not been correctly chosen.

On the remote-controlled machines presently in use, it is possible to obtain a continuous variation of the angle of sweep and a continuous variation of the exposure time. The operator varies these two constants independently of each other by means of two knobs, $B_\alpha$ and $B_t$, respectively, graduated in degrees and in seconds.

According to a first aspect of this invention, there is provided an electrical security device for radiographic machines, notably tomographs, which includes a first potentiometer coupled to the control knob $B_\alpha$ for controlling the angle of sweep and a second potentiometer coupled to the control knob $B_t$ for controlling the exposure time. Further provided is a discriminator, the inputs of which are connected to the wiper arms of the potentiometers. A signal is developed at the output terminals of the discriminator when the ratio of the signals appearing at the wiper arms of the potentiometers equals or exceeds a predetermined value. The output signal of the discriminator is applied to a cut-off mechanism to stop the functioning of the machine.

Additionally, the speed of the motor or motors actuating the radiographic machine may be readily controlled to achieve the desired relationships for the angle of sweep $\alpha$ and exposure time $t$.

According to a further feature of this invention, an electrical device that will provide a control signal for the motors actuating a radiographic machine that is proportional to the desired $\alpha/t$ relationship includes two potentiometers coupled in cascade. The wiper arms of the two potentiometers are coupled with control knobs $B_\alpha$ and $B_t$, the potentials obtained at the terminals of each being according to the value of their resistance respectively proportional to $\alpha$, angle of sweep, and $1/t$, inverse of the exposure time, the potential obtained from the termianls of the ensemble applied to the control of said motors being proportional to the angular velocity $\alpha/t$.

Other objects and features of the present invention will become more apparent from the following description of preferred embodiments of the invention taken in conjunction with the accompanying drawings, wherein.

Figure 1:
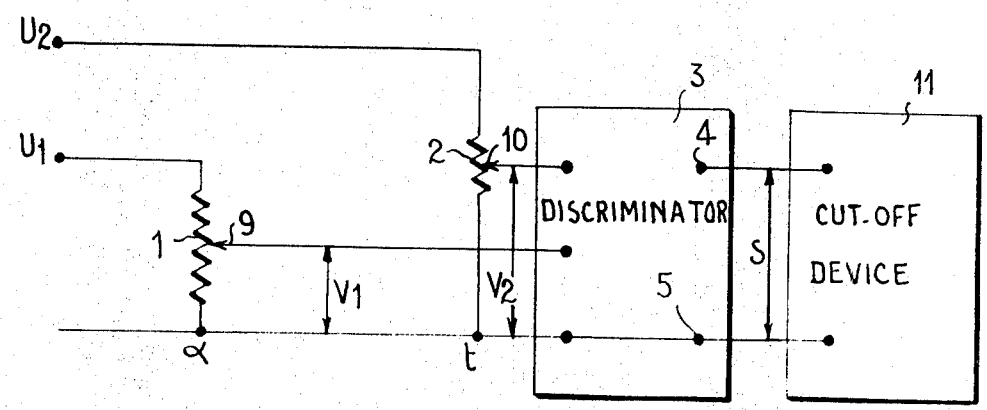
FIG. 1 illustrates an electrical security device for a tomograph in accordance with the present invention.
Figure 3:
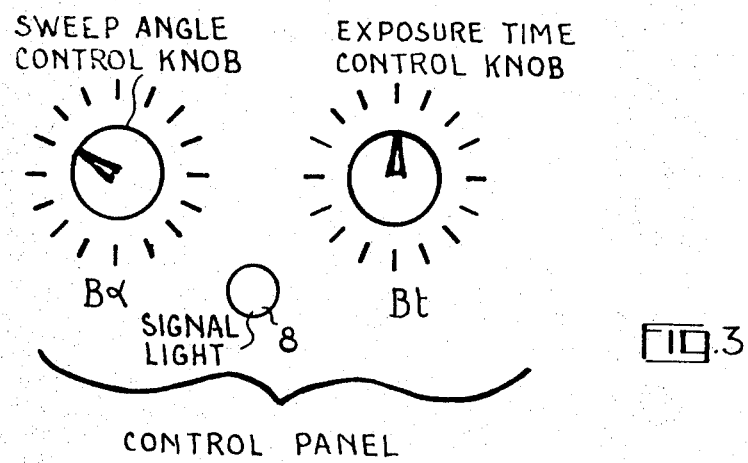
FIG. 3 is a schematic drawing of the control panel for the devices illustrated in FIGS. 1 and 2.

Referring to FIGS. 1 and 3, there is shown a security device in accordance with the invention. Knobs $B_\alpha$ and $B_t$ control the angle of sweep $\alpha$, and exposure time $t$, respectively and are connected to the wiper arms 9 and 10 of two potentiometers 1 and 2, respectively. One fixed terminal of each potentiometer 1 and 2 is connected to potentials $U_1$ and $U_2$, respectively, such that the output potentials $V_1$, $V_2$ taken at the wiper arms 9 and 10 of potetiometers 1 and 2, respectively, are $$V_1 = K_1 \alpha \tag{1}$$

$$V_2 = K_2 t \tag{2}$$

$K_1$ and $K_2$ being determined as follows:

$$V_1 \text{ max.} = U_1 = K_1 \alpha \text{ max., thus } K_1 = \frac{U_1}{\alpha \text{ max.}} \tag{3}$$

$$V_2 \text{ max.} = U_2 = K_2 t \text{ max.}, \text{ thus } K_2 = \frac{U_2}{t \text{ max.}} \quad (4)$$

The inputs of a discriminator 3 are connected to the wiper arms 9 and 10, respectively.

The output S of the discriminator 3, taken between terminals 4 and 5, is zero volts when $V_1 < V_2$, or when $$\frac{V_1}{V_2} < 1$$

However, as soon as $V_1 \geq V_2$ or $$\frac{V_1}{V_2} \geq 1$$

an output signal S is developed. The characteristics of discriminator 3 may alternately be expressed in terms of $K_1$, $K_2$, $\alpha$ and $t$ by utilizing Equations 1 and 2.

Thus, the signal S is developed when $$\frac{K_1}{K_2} \frac{\alpha}{t} \geq 1 \text{ or when } \frac{\alpha}{t} \geq \frac{K_2}{K_1}$$

If $K_2$ and $K_1$ are chosen so that $$\frac{K_2}{K_1} = \omega \text{ max.}$$

$\omega$ max being the maximum allowable angular velocity of the X-ray tube, a signal S will be developed as soon as this value has been reached or exceeded, as determined automatically by the settings of the knobs $B_a$ and $B_t$.

This effect can be achieved because from Equations 3 and 4:

$$\frac{K_2}{K_1} = \frac{U_2}{U_1} \frac{\alpha \text{ max.}}{t \text{ max.}} = \omega \text{ max.} \quad (5)$$

Since $U_2/U_1$ is controlled, the above inequality can easily be achieved by one ordinarily skilled in the art by merely varying the magnitude of the two supply voltages $U_1$ and $U_2$.

The signal S may be utilized in a well known manner to feed a signal light 8 (see FIG. 3) and a cut-off device 11 (such as a relay or the like) which operates to prevent the system from operating under the appropriate conditions.

The discriminator 3 is not shown in detail since the particular design of such circuits is well known in the art. For example, the discriminator 3 may take the form of a differential type amplifier with the output taken from one side thereof. Many other types of circuits, such as threshold circuits may also be implemented as discriminator 3 by one ordinarily skilled in the art within the spirit of this invention.

By way of example the following simple illustration is given to show how the various parameters in the system are chosen to provide operation according to the invention. In order to simplify the illustration normalized values will be used. $\alpha$ max. is the maximum setting of knob $B_a$, $t$ max. is the maximum setting of knob $B_t$ and $\omega$ max.=the maximum allowable angular velocity of the X-ray apparatus. Assume:

$$\alpha \text{ max.} = 1$$
$$t \text{ max.} = 1$$
$$\omega \text{ max.} = \frac{1}{2}$$

where knobs $B_a$ and $B_t$ are calibrated from 0–1.

Then using Equation 5:

$$\frac{K_2}{K_1} = \frac{U_2}{U_1} \frac{1}{1} = \frac{1}{2}$$
$$2U_2 = U_1$$

Thus, for any setting where $\omega$ max.$\geq \frac{1}{2}$, an alarm signal S will be generated. For example, if $\alpha$ is set at $\frac{1}{2}$ and $t$ is set at $\frac{3}{4}$, then $\omega = \frac{2}{3}$, which exceeds $\omega$ max.$= \frac{1}{2}$. For these settings $V_1 = U_{1/2} = 2U_{2/2} = U_2$ and $V_2 = 3U_{2/4}$. Since $V_1/V_2 = (4/3) > 1$, then discriminator 3 will generate an alarm signal S and cause cut-off device 11 to prevent operation of the system. The above simplified example was given merely to illustrate the principles of the invention and to clarify to those ordinarily skilled in the art how to apply the invention in actual practice.

Figure 2:
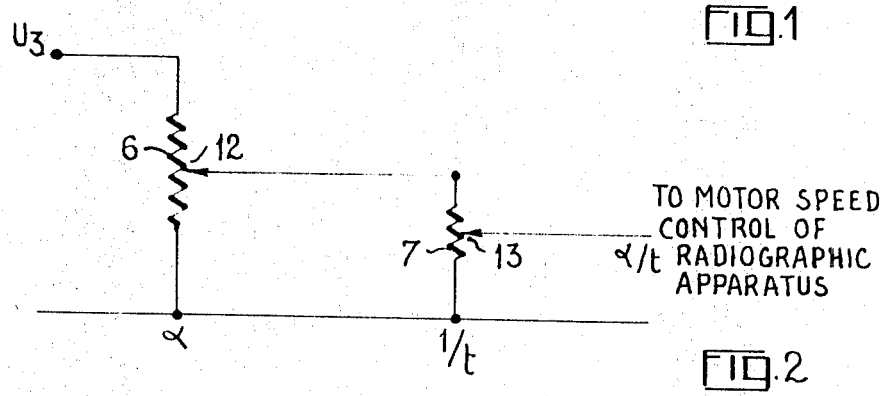
FIG. 2 illustrates an electrical control device for the motor actuating the machine in accordance with the present invention.

According to a second aspect of the invention, it is possible to obtain a potential proportional to the relationship $\alpha/t$, this potential being then utilized to control the speed of the motor or motors which control the functioning of the X-ray equipment. Referring to FIGS. 2 and 3, the wiper arms, 12 and 13, of two potentiometers 6 and 7, respectively, are further connected to the two control knobs $B_a$ and $B_t$, respectively. The resistance element of potentiometer 6 is coupled between ground and a potential $U_3$. The resistance element of potentiometer 7 is coupled between the wiper arm 12 and ground. The output is taken between the two wiper arms 12 and 13. The signal at wiper arm 12 provides a potential proportional to $\alpha$. The wiper arm 13 provides a potential proportional to $1/t$. These two potentiometers, when coupled in cascade, provide an output potential between wiper arms 12 and 13 which is proportional to $$\alpha \times \frac{1}{t} \text{ or } \alpha/t$$

This signal is then fed to the motor controlling the X-ray apparatus to set the speed thereof in accordance with the setting of knobs $B_a$ and $B_t$.

An alternative embodiment of the apparatus of FIG. 1 for providing a cut-off signal to the radiographic device, is to utilize the circuitry of FIG. 2 in conjunction with a threshold circuit coupled btween the wiper arms 12 and 13. Since the signal between arms 12 and 13 is proportional to $\alpha/t$, the threshold circuit, which may take the form of any of various well known circuits, is set to provide an output S (corresponding to output S of FIG. 1) when $\alpha/t$ equals or exceeds $\omega$ max.$=(\alpha/t)$ max. The signal S is then fed to a cut-off device. This alternative arrangement is clearly within the scope of the invention.

Again it is pointed out that the term "discriminator" is not used in its classical sense, i.e., as denoting a discriminator of the type used in radio receivers. The term "discriminator" is used herein to denote a type of circuit which discriminates whether a signal equals or exceeds a given value and then generates an output signal accordingly.

While I have described above the principles of my invention in connection with specific apparatus, it is to be clearly understood that this description is made only by way of example and not as a limitation to the scope of my invention, as set forth in the accompanying claims.

I claim:

1. An electrical security device for radiographic apparatus having first and second controls for independently varying the angle of sweep and the exposure time of the radiographic apparatus, comprising:
   first and second potentiometers having first and second wiper arms, respectively;
   a source of potential coupled to a first terminal of at least one of said potentiometers;
   means coupling said first and second wiper arms to said first and second controls, respectively, the positions of the wiper arms being varied in accordance with the settings of said controls and the signals appearing at said wiper arms being a function of the angle of sweep and the exposure time, respectively;
   means coupled to the wiper arms of said potentiometers for developing an output signal when the value of the signal appearing between said wiper arms equals or exceeds a given value, which corresponds to when the ratio of angle of sweep to exposure time equals or exceeds a predetermined value; and
   cut-off means responsive to said output signal developing means for preventing the functioning of said radiographic apparatus when the value of the ratio of the angle of sweep to the exposure time equals or exceeds said predetermined value.

2. Apparatus according to claim 1 wherein said radiographic apparatus includes motors actuating the apparatus in accordance with the value of the ratio of the angle of sweep to the exposure time, comprising:
third and fourth potentiometers having third and fourth wiper arms coupled to said first and second controls, respectively;
a source of potential connected to a terminal of said third potentiometer;
means coupling the third wiper arm to a terminal of said fourth potentiometer; and
means coupling the signal appearing between said third and fourth wiper arms to said motors for actuating said radiographic apparatus, the signal appearing between said third and fourth wiper arms being a function of the ratio of the angle of sweep to the exposure time.

3. Apparatus according to claim 2, wherein said third wiper arm is coupled to said angle of sweep control such that the signal at said third wiper arm is proportional to the setting of the angle of sweep.

4. Apparatus according to claim 3, wherein said fourth wiper arm is coupled to said exposure time control, the signal at said fourth wiper arm being proportional to the inverse of the setting of exposure time.

5. Apparatus according to claim 1, wherein a first terminal of said other potentiometer is coupled to a second source of voltage.

6. Apparatus according to claim 5, wherein said output signal developing means develops an output signal when the ratio of the signals at said first and second wiper arms equals or exceeds a second predetermined value.

7. Apparatus according to claim 6, wherein said second predetermined value is unity.

8. Apparatus according to claim 6, wherein said first wiper arm is coupled to said angle of sweep control and said second wiper arm is coupled to said exposure time control, the signals at said wiper arms being proportional to the settings of angle of sweep and exposure time, respectively.

9. Apparatus according to claim 8, wherein said predetermined value of said ratio of angle of sweep to exposure time corresponds to the maximum angular velocity of said radiographic apparatus.

10. Apparatus according to claim 9, wherein the values of said first and second voltage sources are functions of the maximum angle of sweep, the maximum exposure time, and the maximum angular velocity.

References Cited

UNITED STATES PATENTS

| 2,916,627 | 12/1959 | Rolke | 250—93 |
| 3,205,360 | 9/1965 | Graves | 250—93 |

JAMES W. LAWRENCE, Primary Examiner

A. L. BIRCH, Assistant Examiner

U.S. Cl. X.R.

250—61.5, 103